Jan. 13, 1970

T. L. FLANAGAN 3,489,113

FLAT ARTICLE PROCESSING APPARATUS

Filed May 13, 1968

INVENTOR
THOMAS L. FLANAGAN
BY
ATTORNEY

Jan. 13, 1970                T. L. FLANAGAN                3,489,113
                     FLAT ARTICLE PROCESSING APPARATUS
Filed May 13, 1968                                         9 Sheets-Sheet 3
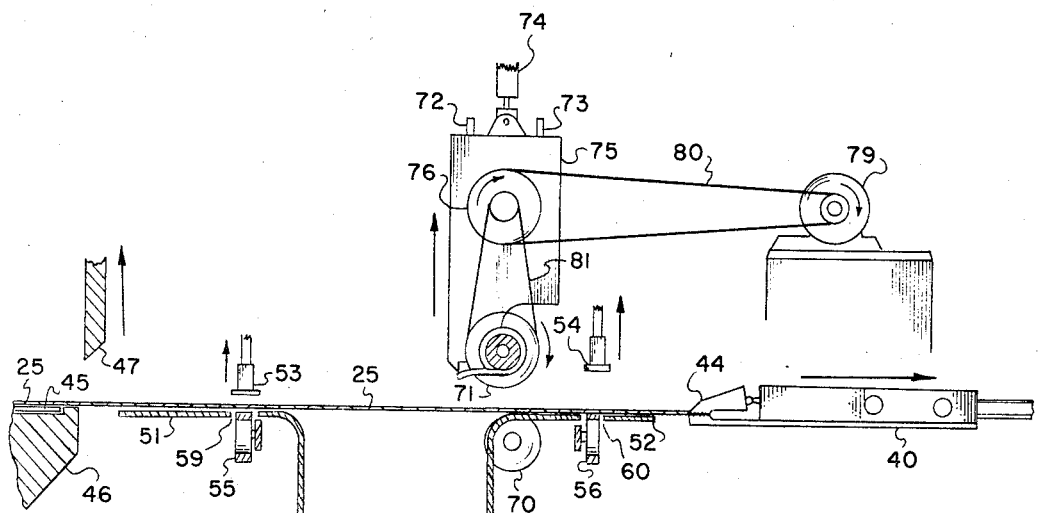
FIG. 3
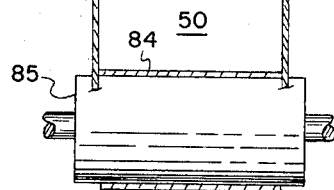
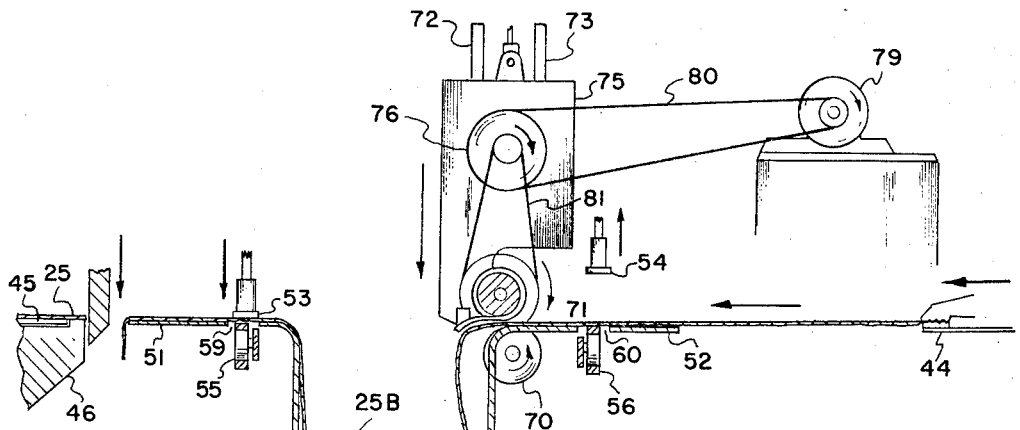
FIG. 4
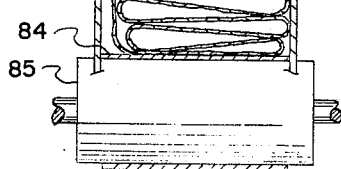
INVENTOR
THOMAS L. FLANAGAN
BY
*Kenneth E. Merklen*
ATTORNEY

INVENTOR
THOMAS L. FLANAGAN
ATTORNEY

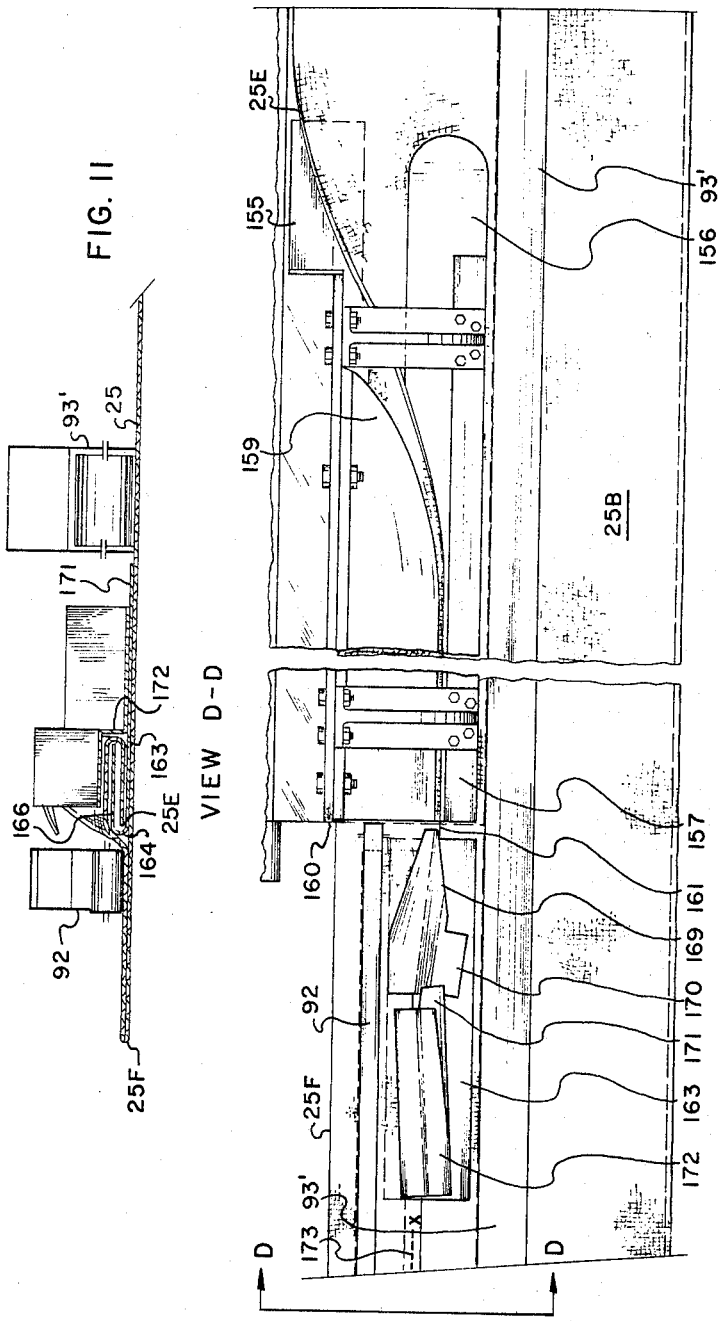

INVENTOR
THOMAS L. FLANAGAN

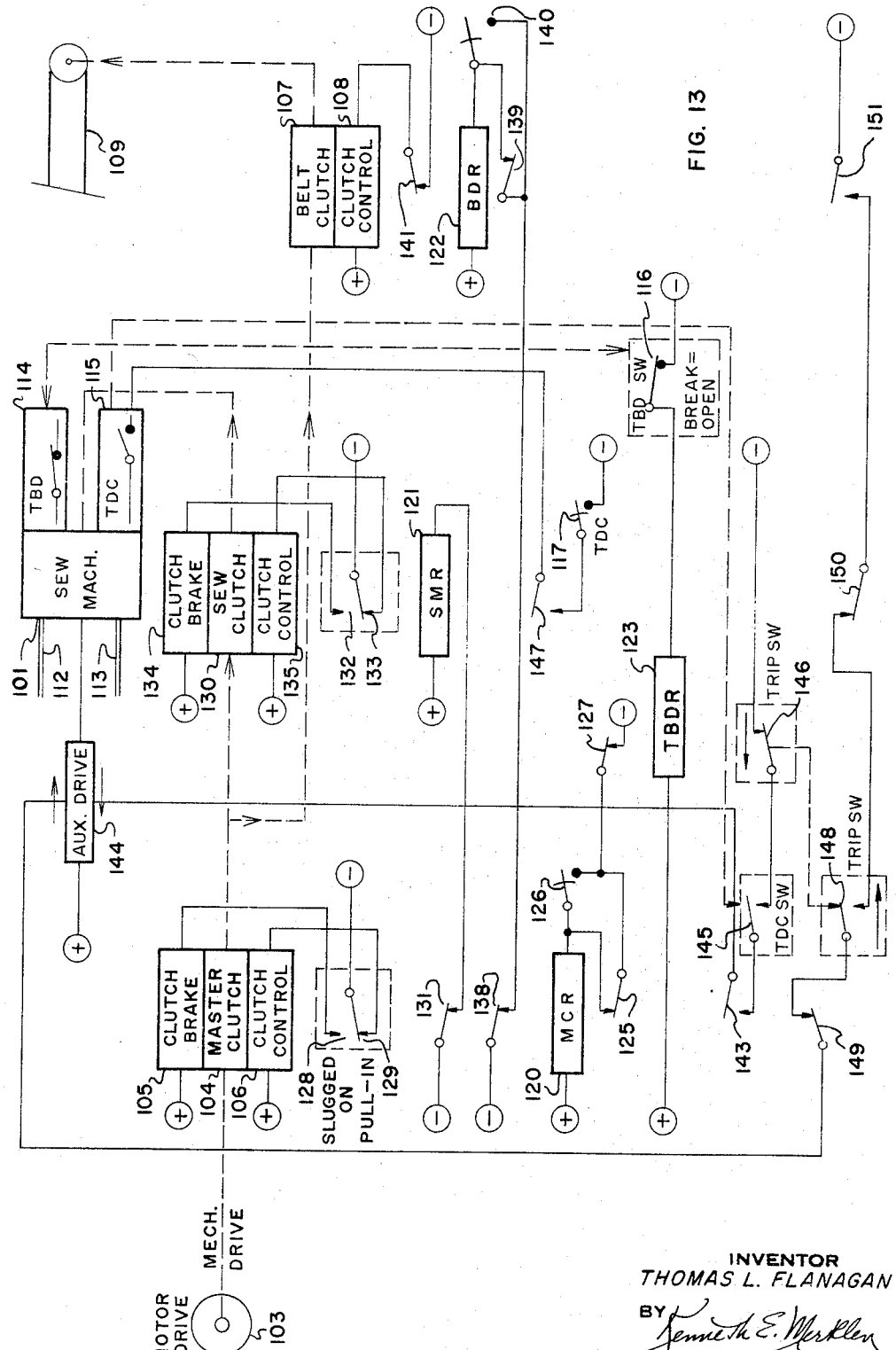

3,489,113
FLAT ARTICLE PROCESSING APPARATUS
Thomas L. Flanagan, Killingworth, Conn., assignor to Wagner Research Corporation, New York, N.Y.
Filed May 13, 1968, Ser. No. 728,664
Int. Cl. D05b 19/00, 27/00
U.S. Cl. 112—2          15 Claims

ABSTRACT OF THE DISCLOSURE

Fully integrated automatic apparatus for processing bulk material into finished flat articles, is presented. A common blank sizing, and cutting device alternately feeds each of the two worklegs. The integrated apparatus includes the advantages of flat draw sizing of blanks and confined, collected conveyance of the blank using novel roll back of the blank body to a confined, collected condition. Simultaneous processing of both edges is accomplished including hem folding the edges and sewing the hems individually. The hem-sew sewing machine includes an automatic mending feature which automatically mends portions of unstitched hems. Wrinkle detecting apparatus is used to detect wrinkles created during hem folding. The integrated apparatus includes individual devices which are cooperatively compatible with each other.

---

The present invention relates to apparatus for automatically processing bulk pliable material, such as cloth, for example, into finished flat articles, such as flat bed sheets, for example. In particular, the present invention relates to improved integrated apparatus for automatically processing such material from a bulk or roll supply into finished flat bed sheets.

Although current technology provides integrated apparatus which automatically processes bulk material into finished articles, certain of the individual functions of the present improved integrated apparatus are great advances over corresponding individual functions found in currently used apparatus. The present improved integrated apparatus of the present invention provides a greatly improved system which advantageously employs components or functioning units which are functionally compatable to each other and to the system as a whole. In order to accomplish more functional compatability among the cooperating units of the system then heretofore available, certain of the functioning units were created which facilitate compact handling of the pieces of material, hereinafter referred to as "blanks" during processing.

The present improved integrated apparatus includes provision for dual worklines, receiving blanks of material from a common material blank sizing and cutting unit. The material is drawn from a supply having a replenishable, easy-draw reserve. The drawn material passes through an inspection means or area which provides for inspecting the material for defects before the material is presented to the sizing and cutting unit. Sizing of the blank, prior to cutting is accomplished by a flat-bed draw arrangement which automatically draws the material, in the desired rectangular configuration, to a predetermined size or length. The length of travel of the flat-bed draw apparatus may be easily and quickly adjusted thus making the draw component readily adjustable. Flat-bed draw sizing appears to have some advantages over other sizing methods in that flat-bed drawing of material appears to have uniform draw power which is exerted across the entire width of the material.

Flat-bed draw sizing formally employed flat blank transport of the cut blank. A more advanced method is the draped or hanging blank body transport method. The present improved system provides a method of dual level, confined blank transportation, which is a great improvement over all former methods. In order to accomplish dual level, confined transportation, the new function of flat-bed controlled, blank roll-back and confined collecting was created. Thus, after a predetermined amount of material has been drawn, in flat form into the blank sizing and cutting unit, the material is severed thereby creating or forming a cut blank. With the cut blank laid out flat, under complete control, a portion of the blank body is rolled back and collected in a transfer channel in a confirmed, collected condition. This has the advantage of reduced-width transportation found in the method of draped or hanging body transportation. However, the present improved system further advances the method of reduced-width transportation by placing the bulk of the cut blank in a confined, collected condition in a transfer channel which permits rapid transfer of the blank through a narrow space and prevents the body of the blank from floating due to the aerodynamic effect on a loosely draped or hanging body of pliable, flimsy material during rapid transfer along the workline. In addition this improved method of transferring or conveying a blank along a workline in a collected, confirmed condition permits rapid changes in transfer or conveying speed since the body of the blank is under complete control.

Each workline of the dual leg arrangement includes a right shoulder and a left shoulder, separated by the transfer channel in which the main portion of the body of a blank is transferred in a confined, collected condition. The edges of the blank, between the leading and trailing ends are held on the shoulders where work is preformed on each edge, separately. Each edge is passed through a continuous flow, passive folding device and an underfolder to form a folded hem. Each folded hem is then individually sewn so that the folded hem is essentially made permanent.

Each hem sewing machine includes a control system for mending a sewn hem in the event of a breakage in the thread used for sewing the hem, as it is presented to the needle of the sewing machine.

In addition, the present system includes a wrinkle detection device which is particularly useful in detecting wrinkles developed in relatively long sheets of material being conveyed along a workline.

The leading and trailing ends of the sewn hems on the respective edges of the blank are closed thus forming the finished flat article.

In transferring the blank from the sizing and cutting device, the cut blank is conveyed out on to the workline or leg rapidly so as to evacuate the sizing and cutting device rapidly and prepare the device for sizing the next blank. The blank then in conveyance, when one evacuated from the sizing and cutting device, is conveyed more slowly, through the hem folding device and the hem sewing machine at a speed which corresponds to the sewing speed of the sewing machine until the hem, on each side is fully sewn. The blank is then conveyed at an excellerated speed until the leading edge of the blank approaches the hem-close sewing machine for closing the leading edge of the hem. When in the correct position the blank is arrested, being held at a stop while each leading edge of the hem is sewn closed. The blank is then rapidly advanced along the workline until the trailing edge of the blank approaches a hem-close sewing position at which position the blank is again arrested and held at a stop while the trailing edge of the hem is sewn closed. After the trailing edge of the hem has been sewn closed the flat article is essentially finished, made into a flat bedsheet, for example. The finished article is then advanced along to the end of the workline where the finished article may be removed from the workline and folded, if desired, It is therefore an object of the present invention to provide an improved apparatus for automatically processing bulk web material into finished flat articles.

Another object is to provide an improved flat article processing apparatus which includes a flat draw arrangement for sizing a blank and a controlled roll back of the drawn material into a confined and collected arrangement for controlled transfer of the blank after having been cut.

Another object is to provide an improved flat article processing apparatus which conveys a flat article blank along the workline with the body of the blank in a confined, collected condition.

Another object is to provide an improved flat article processing apparatus which includes a traveling mender sewing machine.

Another object of the present invention is to provide an improved apparatus for processing bulk material into flat articles in which the flat article blanks are conveyed along a workline at controlled, varying speeds with relatively rapid acceleration and deceleration of the blank while changing from one conveying speed to another.

Another object of the present invention is to provide an improved flat article processing apparatus which include apparatus for detecting wrinkles occuring in relatively large sheet material blanks.

These and other objects will become apparent from reading the following detailed description of the invention with reference to the accompanying drawing in which:

FIGS. 3, 4 and 5 are sectional views across line A—A in FIG. 2 showing stages of the operation of the blank sizing, blank cutting and controlled roll-back for providing confined, collected transfer of the cut blank;

FIG. 10 is a plan view of part of one shoulder of one workline showing the continuous flow folder and underfolder;

FIG. 11 is a cross section elevation view along the lines D—D of FIG. 10;

FIG. 13 is a functional circuit and block diagram showing one control system for the traveling mender sewing machine.

Figure 1:
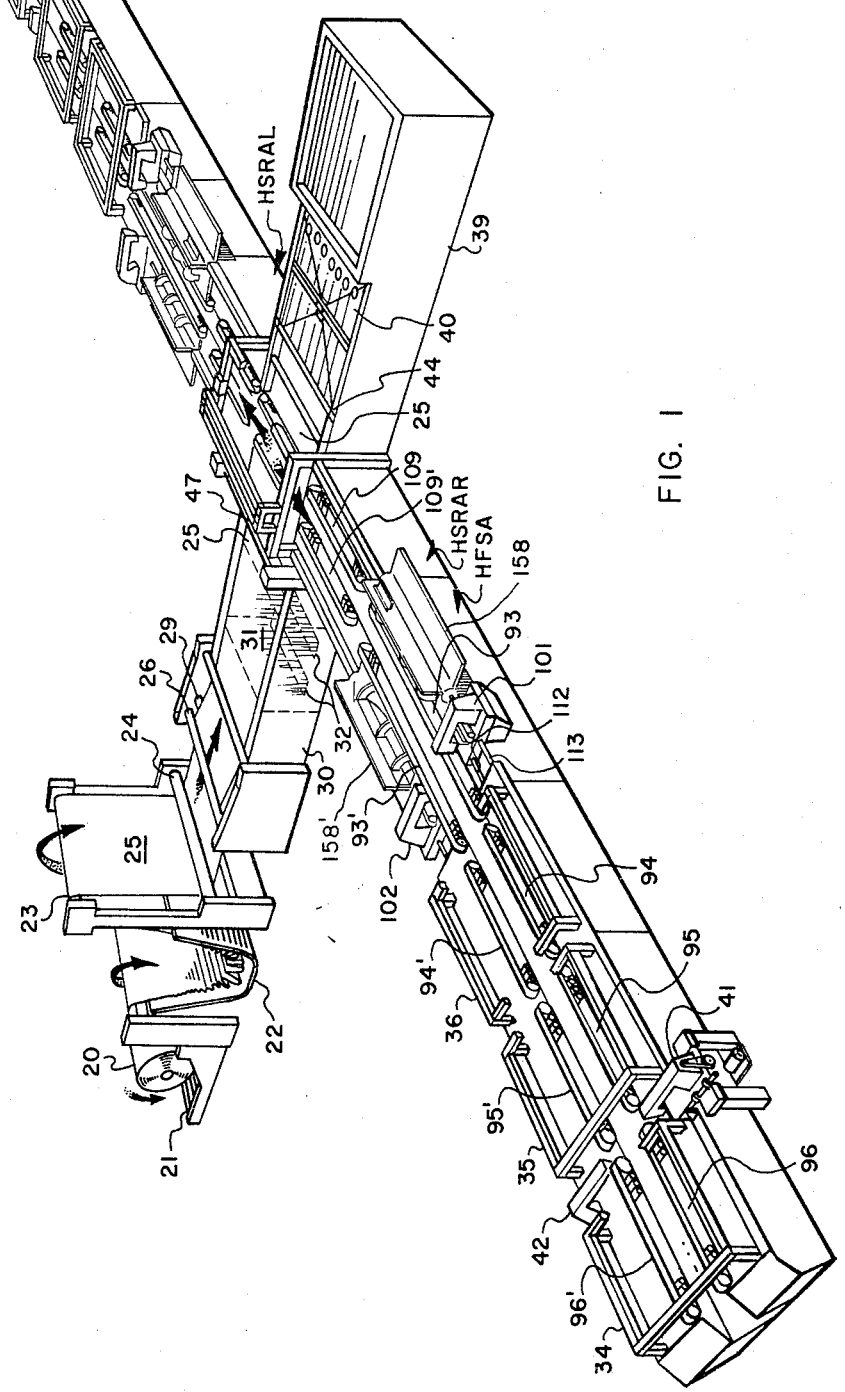
FIG. 1 is an overall pictorial view of a preferred form of the invention.

Referring in more detail to FIG. 1, a preferred arrangement of the present improved flat article processing apparatus is presented in which a roll or bulk supply 20 of web material is positioned on a set of rollers 21. For the purpose of this description let it be assumed that the roll 20 is a roll of web material such as muslin, or other cloth out of which bed sheets are made. Let it further be assumed that the flat article to be made is a flat bed sheet.

Although it is assumed that the roll 20 is a web material and the flat article processed from such roll is a flat bed sheet other flat articles may be processed from the same or different web material employing the same principles described herein. In addition, the roll of material could be any pliable or cloth-like material, depending upon the finished article into which the bulk supply is processed.

The width of the bed sheet so made depends on the width of the material which is essentially uniform along the length of the roll. The roll 20 is assumed to have selvaged edges along its length and the roll itself, when it is placed on the roller 21, is assumed to have a length of several thousand yards. From such material, bed sheets of predetermined length and having a width which is equal to the width of the material of roll 20 mal be made.

The roll 20 is thus positioned on the rolls 21 which permits the drawing of the material from the roll as the roll rotates on the rollers 21. In order to reduce the draw strength required by the flat bed drawing apparatus a loose supply of material is provided and maintained available in a reserve supply at 22. The loose material, the reserve supply 22, is drawn off the roll 20 by a pair of motor driven rolls (not shown) and the supply 22 is replenished as needed. The material 25, when drawn by the flat-bed drawing apparatus, is drawn from the loose supply 22, over the wrinkle eleminator rollers 23 and through the material alignment rollers 24.

The sheet material 25 is then drawn through an inspection area that includes a scanning device which may be a light source, represented by 26 which lights an area across the width of the sheet material, and a photosensative device, represented by 29. Normally the light from the light source 26 passes through the sheet material which is assumed translucent, the intensity of the light passing through the material is determinable according to the intensity of the light transmitted and the translucent characteristics of the sheet material. If the sheet material is torn or has a hole therein the intensity of the light received by the photosensitive device will increase above the normal intensity. If the sheet material is soiled or mended the light intensity received by the photosensitive device will decrease. Thus, the sheet material may be scanned for purposed of inspection. In addition, a visual inspection table is provided. The portion 30 may include an inspection chamber 31 (represented by broken lines in the table portion 30). This inspection chamber may include a light source 32 (shown in phantom form) which illuminates the sheet material from under the material and very small defects in the material, which may not vary the light intensity at the inspection scanner sufficient to provide response by the inspection scanner, may easliy be seen.

The sheet material is then drawn under the guillotine cutter of the blank cutting device, with flat-bed-draw, is illustrated in more detail in FIGS. 2, 3, 4 and 5 to be discussed later.

After a portion of the sheet material has been drawn into the blank sizing device the material drawn into the sizing device is severed from the bulk supply thereby forming a blank of predetermined size. Since the width of the sheet material is the width of the finished flat sheet it may be said the blank is cut to length. The finished sheet will be shorter than the length of the blank cut by the sizing and cutting device since the cut edges of the blank will be hem-folded thus forming finished edges.

A portion of the body of the cut blank is rolled back, under controlled conditions, and collectively confined in a transfer channel. The cut edges are held on the shoulders of the transfer channel. When the cut blank is transferred out of the blank sizing and cutting device the edges of the blank are positioned so as to pass along and through the worklines of the workleg to which the cut blank is transferred.

Each leg includes two shoulders or worklines, a right shoulder or workline and a left shoulder or workline, which combine to form an integrated workline for substantially simultaneously processing the both edges of a cut blank into a finished flat bed sheet as the blank is conveyed along the leg. It may be said that the shoulder or workline of the same leg or workleg are mirror images of each other, the shoulders being separated by the transfer channel which extends the entire length of the workleg. In addition, each workline component-wise and component-positionwise is essentially a mirror image of the other. Since both edges (opposite edges) of a cut blank are processed substantially simultaneously, the oppositely positioned hem folding devices of the same leg may be of different size since it may be desired to make flat bed sheets with one size hem at one end and another size hem at the other end.

It will be appreciated that since each of the worklines are essentially the same, a description of one workline will be a description of all worklines.

As will be more fully discussed below, the cut blanks are alternately evacuated to the left, and then to the right, out of the blank sizing and cutting device. In order to accomplish this the blank transfer or blank conveying apparatus is reversible with respect to transferring or evacuating cut blanks from the sizing and cutting apparatus. This is represented and described with reference to FIG. 6.

Following a cut blank which has just been created in the sizing and cutting device, it will be seen that the blank is in a transfer condition, that is, each cut edge, and a predetermined portion adjacent to such edge, is positioned on a shoulder at a level somewhat above the level of the transfer channel and essentially the remainder of the body of the cut blank is collectively confined in the transfer channel. This operation may be seen in progressively presented steps or stages in FIGS. 3, 4 and 5.

The blank is then transferred at relatively high speed out of the sizing and cutting device to a high speed transfer receiving area of one of the legs. When the sizing and cutting device has been fully evacuated the device commences a new cycle beginning with the grasping of the cut edge of the sheet material by the draw clamp. This cycle of the apparatus will be fully described with reference to FIGS. 2, 3, 4 and 5 below. The high speed receiving area on the right leg is labeled HARAR in FIGS. 1 and 2 and the high speed receiving area on the left leg is labeled HSRAL, in FIG. 1.

When the blank has been fully transferred into the high speed receiving area the leading edge of the blank will be ready (positionwise) to enter the hem folding device. Just prior to the leading edge of the blank entering the hem folding device (both cut corners of the leading edge enter the respective hem folding devices substantially simultaneously) the transfer speed is reduced to essentially the sewing speed of the sewing machines 101 and 102 positioned at the end of the hem folding device. The blank is then transferred or conveyed along the leg (dual workline) so that each cut edge passes through a hem folder which folds the hem in an over fold arrangement and provides a hem with a finished edge by folding the cut edge under. This is clearly seen in FIG. 9 and will be fully described below with reference to FIGS. 9, 10, and 11.

When the folded edge exits from the folding apparatus the hem is sewn in place by a sewing machine as the blank is conveyed through the sew point of the sewing machine. These sewing machines may be conventional lock-stitch sewing machines and are labeled 101 and 102 in FIG. 1.

Figure 8:
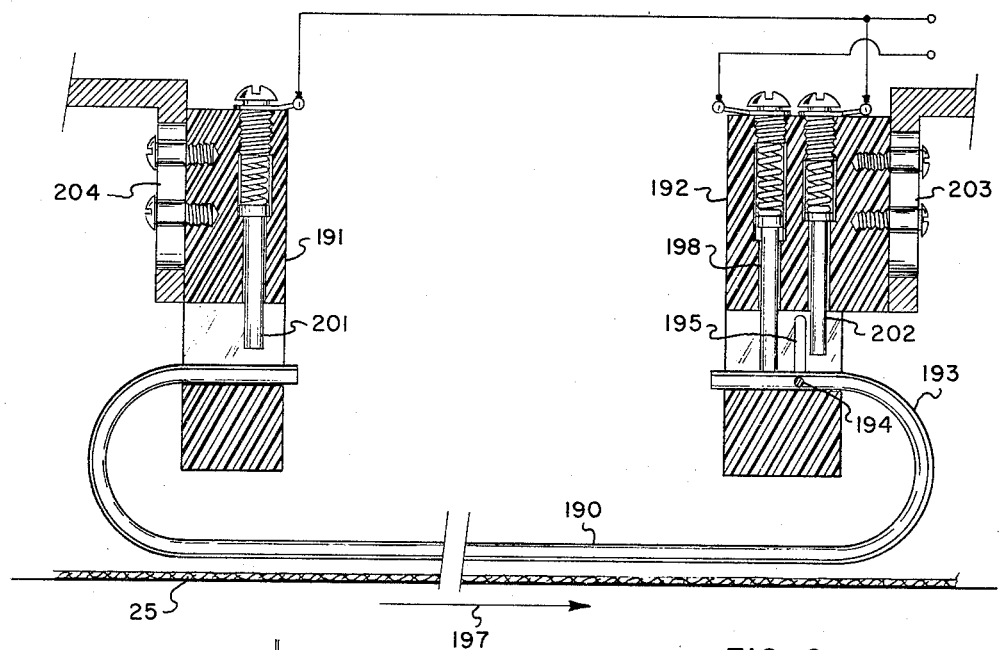
FIG. 8 is a sectional view along the lines C—C of FIG. 7 showing both mountings and the elongated-C wrinkle sensor.
Figure 7:
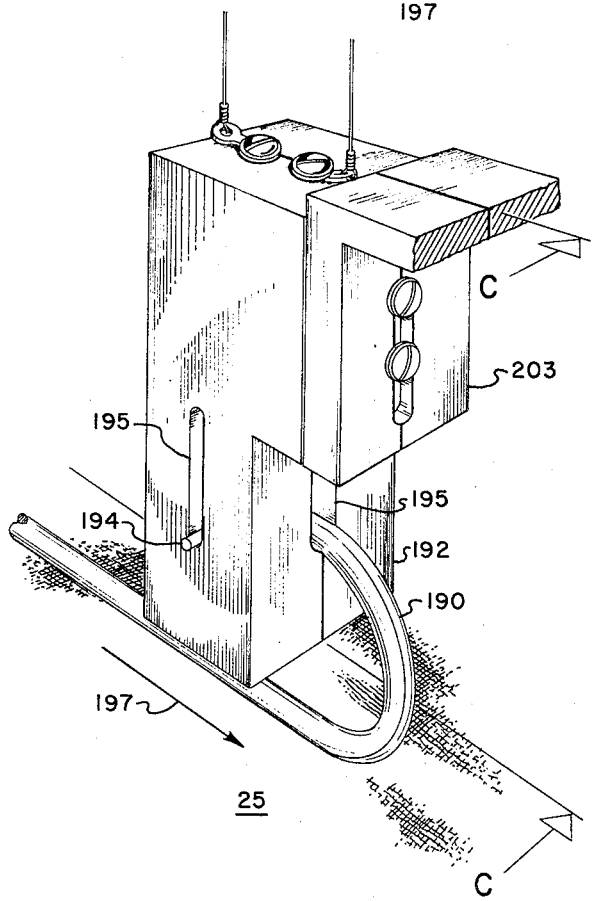
FIG. 7 is a perspective view of one of the mountings of large sheet wrinkle detection unit.

As the blank is conveyed along the leg at the sew speed, a portion of that part of the blank on each shoulder of the leg passes under an elongated-C wrinkle detector. This provides for continuously monitoring or sensing the edges and adjacent portions of the blank for wrinkles which may develop and lie in the hem folded edges. If a wrinkle or wrinkles develop on the edge portion of the blank such wrinkling will be sensed by the elongated wrinkle detector. Such wrinkle detection apparatus is illustrated in FIGS. 7 and 8, to be described below.

Figure 2:
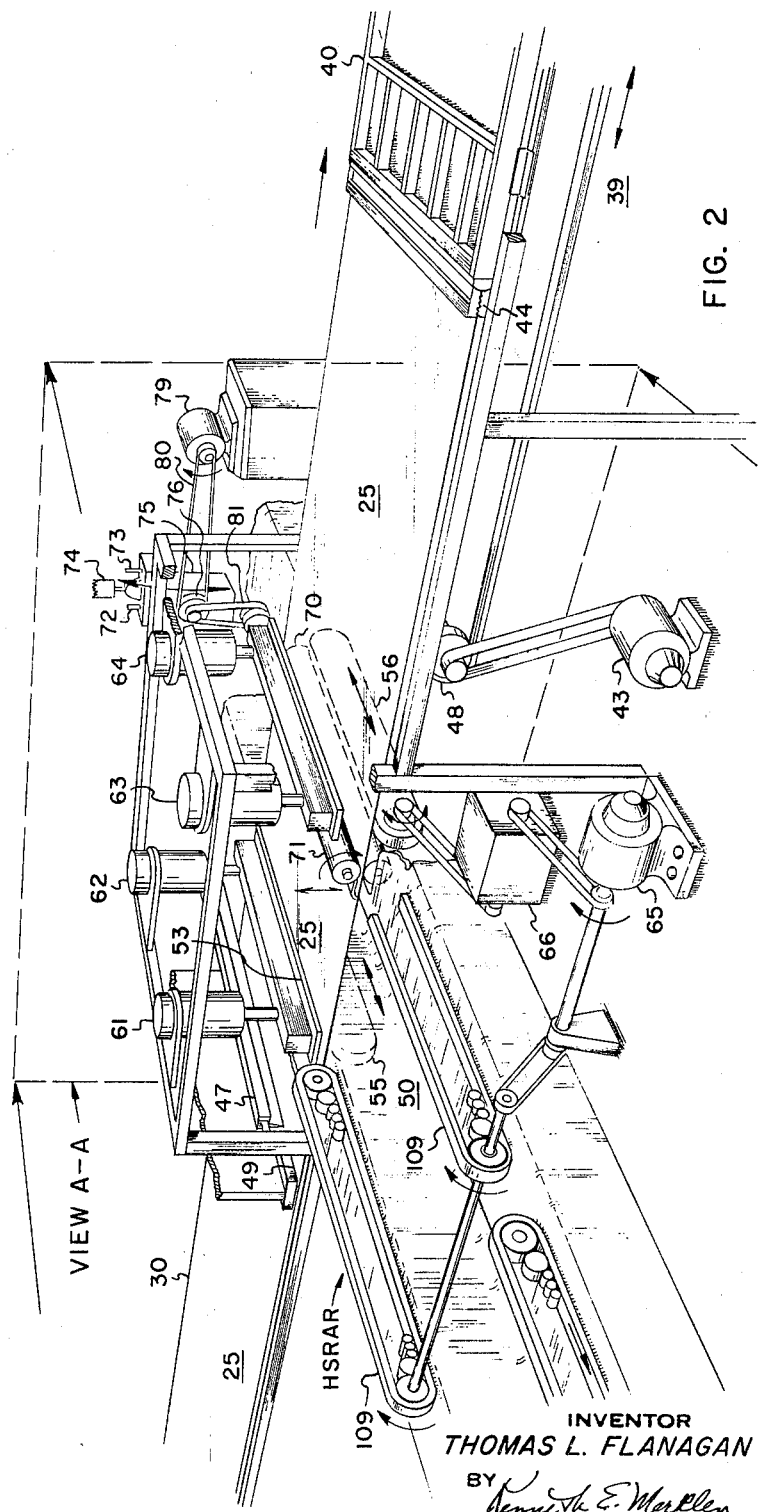
FIG. 2 is a more detailed drawing of the blank sizing and cutting apparatus with a flat blank-drawing arrangement.

After the trailing edge of the hem folded edges pass through the respective sewing machines the transfer speed of the blank is increased and when the leading edge approaches the set of sewing machines (41 and 42) for closing the hemmed edges, the transfer speed is rapidly decreased and the blank is arrested and held stop while the set of hem close sewing machines 41 and 42 sew the leading edge of the hem closed. The sheet blank is then advanced until the trailing edge of the sewn hem is in position to be sewn closed. At such position the sheet blank is again arrested and held stop while the hem close sewing machines sew the trailing edge of the hems closed. After the trailing edge of the sheet blank has been sewn closed the sheet blank has all the characteristics of a finished flat sheet. In referring to FIG. 1 a series of rectangular frame structures 34, 35, 36 may be observed on each leg. Some of the overhead frame structure has been omitted for the sake of clarity. The frame structures are mounted on (and over) the respective shoulder-worklines of the leg and extend above the work surface and transfer channel. Also seen are a plurality of transfer belt pairs 109/109', 93/93', 95/95' and 96/96' employed to convey or transfer the sheet blank along the leg. The transfer belts, or transfer belt pairs such as belts 109 and 109' of FIG. 2 are positioned above the surface of the shoulder so that the bottom of the endless belt slides along a portion of the shoulder and conveys the sheet blank along the shoulder as the belt is rotated. The overhead frame structure is used to suspend the transfer belt structure (including pulleys and/or drives) in desired relation to the shoulder. These belts may be similar to the conveyer belt described in my copending application Ser. No. 699,910, filed Jan. 23, 1968 under the title "Belt Conveyor With Pressure Distribution Means." The pulley or drive and idle wheels of the belt may be mounted in position by means of the rectangular structures represented by 34, 35, and 36. A drive means for the belt conveyor is represented in FIG. 2.

The flat-bed draw mechanism is represented by a draw mechanism housing 39 and a carriage frame 40. The carriage frame 40 is coupled to suitable mechanism (motor 43 and drive belt 48) for reciprocating the carriage frame back and forth along the housing 39. An elongated draw clamp 44 is coupled to the carriage 40 and the clamp 44 is employed to grasp the cut edge of the sheet material, 25 for drawing a portion of the sheet material into the sizing device. The carriage 40 is illustrated in FIG. 1 as a reinforced structure to which the draw clamp 44 is connected. The draw clamp 44 is elongated and subject to being bent out of straight alignment. The reinforced structure of the carriage prevents bending of the clamp 44 and thus ensures that the material 25 will be clamped and drawn uniformly and squarely into the sizing device. Control of travel of the carriage 40 is represented by the reversible motor 43 and belt 48, (FIG. 2) which is coupled, be suitable coupling, to the carriage 40. The motor 43 operates first in one rotational direction to move the carriage 40 and the material 25, clamped by the clamp 44, into the sizing device and subsequently reverses its rotational direction and controls the motion or movement of the carriage in the opposite direction during the collecting of the body of the sheet blank. This operation to be described later, may be programmed, as desired, to synchronize work evacuation of the sizing and cutting apparatus.

Attention is directed to FIGS. 2, 3, 4 and 5, FIG. 2 being a more detailed view of the blank sizing and cutting apparatus. FIG. 3 in particular is a sectional drawing along line A—A of FIG. 2 with the apparatus in substantially the same phase of the cyclic operation as shown in FIG. 2. As seen particularly in FIGS. 2 and 3 the draw clamp 44 has the edge of the sheet material 25 clamped and is drawing the sheet material into the blank sizing apparatus.

The material 25 is drawn over cut-edge control apparatus represented by the recessable plate 45 which is represented as recessed in the anvil 46 of the guillotine blade 47. FIG. 2 illustrates a holddown 49 positioned before the blade 47. The cut edge control apparatus is the same as that disclosed and claimed in by co-pending application Ser. No. 728,519 filed on the same date as the present application. Briefly, the recessable plate 45 is pivotally mounted so that the edge which is recessed into the anvil 46 is arcuately lifted to elevate the cut edge (previously cut) of material 25. After the plate 45 and the cut edge are elevated the plate 45 is radially withdrawn from under part of the elevated edge of the material thereby exposing the edge of the material. At this point in the cycle of operation the blade 47 has raised the blade so that the cut edge is fully exposed, and the draw clamp 44 passes under the blade 47 and closes on the edge of the material 25. The draw clamp 44 then draws the material 25 into the blank sizing and cutting device as illustrated in FIG. 3. The blade 47 is lowered and raised by suitable means, not shown.

Figure 5:
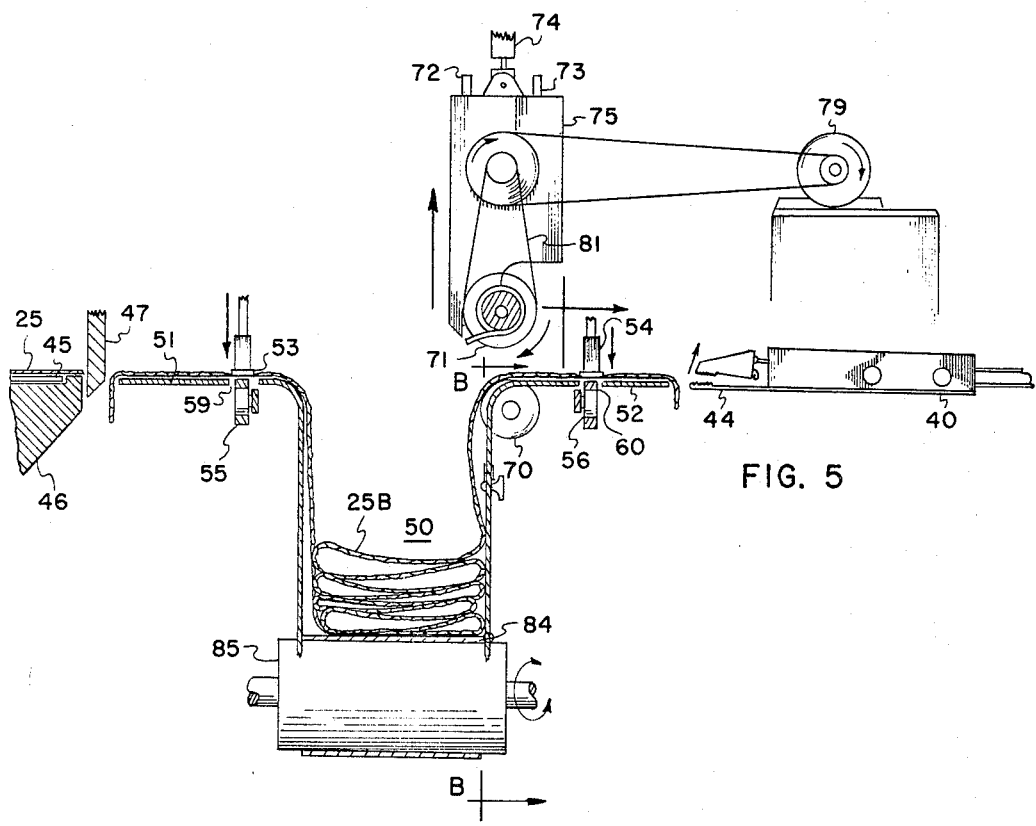

Looking at the blank sizing apparatus (FIGS. 3, 4 and 5), a transfer channel 50 separates two shoulders 51 and 52. Each shoulder includes a sheet blank conveyor means which includes an endless belt 55 and 56 (one on each shoulder) and a presser bar 53 and 54 (one on each shoulder) cooperates with its respective endless belt 55 and 56 to form a sheet blank conveyor means which may transfer the cut blank to the left or the right, out of the blank sizing and cutting apparatus, according to the direction of rotation of the endless belts 55 and 56. Each belt is positioned below the shoulder in which the belt is located and communicates with the cut sheet blank through an opening in the shouder such as seen at 59 and 60. The presser bars 53 and 54 are each coupled to means for raising and lowering the bars so that the cut sheet blank lying on the shoulder may be pressed against the conveyor belt for transferring the blank. The surface of the bar contacting the sheet blank is a low friction surface, with respect to the sheet blank material. Thus, when the sheet blank has been cut, such as seen in FIGS. 4 and 5 the cut blank material may be held on the shoulder by closure or lowering of the presser bar 53 onto the sheet blank material and there by clamp the sheet blank between the presser bar 53 and the then stationary endless belt 55. The presser bar 54 is shown lifted in FIGS. 2, 3, and 4 and is lifted sufficiently high to permit passage of the clamp 44 and part of the carriage 40 there between. The cylinders 61 and 62 represent a means of raising and lowering presser bar 53 and cylinders 63 and 64 represent a means of raising and lowering presser bar 54.

FIG. 2 includes a motor 65 which represents a source of motive power. The motor 65 is coupled to the endless belt 56 via a gear box 66. Belt 55 is also coupled to an output of the gear box 66 by suitable means, not shown, so that both transfer belts 55 and 56 are driven in synchronism to effect transfer of a sheet blank from the blank sizing and cutting device. The box 66 represents a gear box in which the output is reversible so that the endless belts 55 and 56 may be rotated clockwise for conveying a sheet blank in one direction, to the left, for example and may be rotated counter clockwise for conveying a sheet blank in the other direction, for example to the right, as desired.

The motor 65 is also coupled to the transfer belts 109 and 109' by means of a drive shaft and belt coupling assembly. The drive structure may also include a belt drive clutch (not shown in FIG. 2). The motor 65 may be coupled to the drive system by means of a master clutch, such as represented in FIG. 13 by block 104, the belt clutch (not shown in FIG. 2) being represented by block 107 in FIG. 13.

The blank sizing and cutting apparatus also includes a sheet blank roll-back assembly which includes the idler-roller 70, which is set in one of the shoulders of the apparatus and a drive-roller 71, which is lifted above the shoulder to permit passage of the draw clamp 44 and part of the carriage 40 therethrough and is lowered to communicate with part of the body of the sheet blank after such blank has been drawn to size and cut from the bulk material.

Referring to FIGS. 4 and 5, it will be noticed that the guillotine blade 47 is lowered and cooperates with a shearing edge of the anvil 46 to cut the material 25 thereby forming a cut blank 25B. The cut edge of the material 25 thus lies flush with the shear edge of the anvil 46. In order that the draw clamp 44 grasp the cut edge of the material 25, the edge is exposed after the blade 47 is lifted away from the shear edge of the anvil. Let it be assumed that the blank previously cut has been transferred out of the blank sizing and cutting apparatus and the presser bars 53 and 54 are both lifted or raised and the drive-roller 71 is also raised so that the draw clamp 44 and the carriage 40 may be driven over the shoulders 51 and 52 and transfer channel 50 by means of the reciprocating drive including reversible drive motor and belt drive 48.

As more fully described in my said co-pending application, Ser. No. 728,519 the plate 45 will elevate the cut edge of the material 25 thus exposing the edge so that the draw clamp 44 may grasp the cut edge. The draw clamp 44 on the carriage 40 will be driven toward the exposed cut edge and the open jaws of the clamp will close and grasp the cut edge of the material. After the draw clamp jaws close on the cut edge of the material 25 the carriage 40 (and thus the draw clamp 44) will be driven away from the cutting device drawing the material 25 into the blank sizing and cutting apparatus. This phase of the blank sizing and cutting operation or cycle is represented in FIGS. 2 and 3. The size (length) of the blank depends on the amount of material 25 drawn into the blank sizing and cutting apparatus. This depends on the amount of travel of the carriage which travel may be adjustable. This may be accomplished by providing adjustable position stops for limiting the outbound travel of the carriage or by controlling or programming the drive means 43/48 coupled to carriage 40.

When the desired length of material has been drawn into the blank sizing and cutting apparatus the presser bar 53 is lowered and clamps the material 25 between the bottom of the presser bar 53 and the then non-rotating belt 55. The plate 45 is returned to a recessed position (as shown in FIG. 3) and the guillotine blade 47 is lowered to sever the drawn material from the supply (as shown in FIG. 4) thereby forming a sheet blank 25B of predetermined size.

After the sheet blank 25B is formed the most recently cut end is held on the shoulder 51 (this is seen in FIG. 4) while the body portion of the sheet blank is rolled back, under controlled conditions and deposited or collected in a folded form in the transfer channel 50. FIG. 4 illustrates this phase of the operation and shows the driver-roller 71 lowered on the body of the sheet blank and the draw clamp moving toward the transfer channel.

The driver-roller 71 is mounted to rise above and be lowered onto the roller 70. The driver-roller 71 is mounted on a pair of vertical rails (not shown) along which the roller travels. A drive belt 81 serves to drive the driver-roller 71 and to lift the roller 71 as the housing 75 is raised and lowered on the vertical rails 72 and 73. A means of raising and lowering the housing 75 on the rails 72 and 73 is represented by cylinder 74, illustrated in part. The housing 75 serves to mount a slip clutch drive 76 which transmits power to the driver-roller 71 via the belt 81. A motor 79 is employed to supply power to the slip clutch 76 via belt 80.

The belt drive 80 may be spring-load, if desired to eliminate slack as the roll-back assembly travels up and down on the rails 72 and 73.

The slip clutch 76 prevents excess power from being applied to the driver-roller 71 when roller 71 is in communication with the sheet blank 25B. The draw clamp 44 and carriage 40 are moved forward thus controlling the forward movement of the body of the sheet blank. Although the slip clutch 76 prevents the driver-roller 71 from skidding on the sheet blank 25B, since the driver-roller has a tendency to move the sheet blank faster than permitted by the advance of the draw clamp, sufficient power is transmitted to the driver-roller to maintain the portion of the sheet blank between the driver-roller 71 and the draw clamp 44, taut. This is illustrated in FIG. 4.

After the draw clamp 44 has advanced to a predetermined position so that a predetermined amount of the sheet blank remains on the shoulder 52, the presser bar 54 is lowered and the roll-back assembly is raised. The jaws of the draw clamp are then opened and the sheet blank 25B is ready to be transferred out of the blank sizing and cutting apparatus. This condition is represented in FIG. 5.

In order to evacuate the cut sheet blank 25B from the blank sizing and cutting apparatus the transfer belts 55 and 56 are rotated. As represented in FIG. 2, the motor 65 is mechanically coupled to the gear box 66. An output of box 66 is illustrated as connected to the drive pulley for rotating the conveyor belt 56. Suitable coupling means also couples the same or similar output to the conveyor belt 55. Thus, according to the direction of rotation of the belts 55 and 56, a cut sheet blank will be transferred from the blank sizing and cutting device to one workleg or to the other.

A major portion of the body of the sheet blank 25B is confined in the transfer channel 50 during transfer. The channel 50 may be a smooth walled and smooth floor channel which has low friction characteristics with respect to the material of the sheet blank. It may be desired to provide a transfer means forming the floor of the channel 50. This may be seen in FIG. 6 where an endless belt 84 is driven by the pulley wheels 85 and 86. This transfer channel floor transfer belt 84 would be driven in synchronism with the transfer belts 55 and 56, and in the same direction thereby transferring the sheet blank out of the blank sizing and cutting apparatus on to the workleg. The transfer channel floor transfer belt of either workleg, such as represented by belt 89 and pulley wheels 90 and 91 would be driven in the same direction at all times, as opposed to the reversible characteristic of the dual direction transfer channel floor transfer belt 84–85–86. Suitable means may couple the output of the gear box 66 to the transfer belt 84–85–86 to maintain such transfer belt synchronized with the shoulder-positioned transfer belts 55 and 56.

Figure 6:
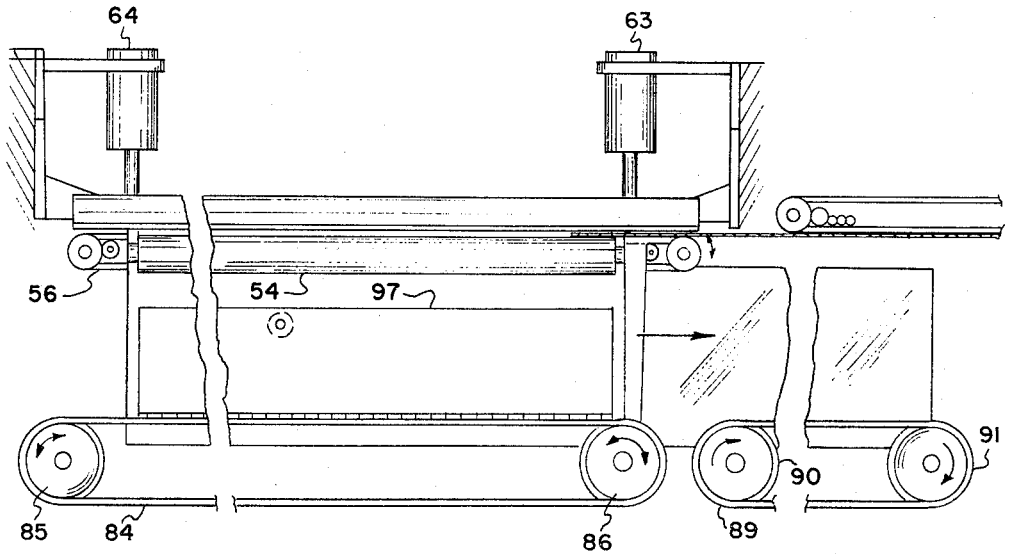
FIG. 6 is a cross section view along the lines B—B of FIG. 5.

It will be noted in FIGS. 1, 2, and 6, in particular that the transfer belts on the worklegs are positioned above the shoulders of the worklegs. It will be appreciated that the overheat structures, represented by 34, 35 and 36 in FIG. 1 may be used to support or suspend the pulley wheels around which the transfer belts ride, by suitable means so that a sheet blank is conveyed or transferred along the workleg with each edge of the blank to be processed held on one of the shoulders of the workleg.

Referring to FIG. 1 in particular it will be noticed that the fully illustrated workleg shows a plurality of individual transfer belts on each shoulder of the workleg. It will be appreciated that since the shoulders of one workleg are in mirror image, transfer belts in corresponding positions along the workleg (making a pair of transfer belts) may be driven in synchronism, that is driven at the same rate and at the same time. All belts along the same workleg are driven in the same direction. Thus, each pair of transfer belts may have their own drive motor and the motor may be programmed to rotate the transfer belts according to a desired plan or a common drive means may be provided with mechanical linkage to each of the belts including suitable gearing and clutch coupling so that each pair of transfer belts may be operated as independent units. The latter arrangement is preferred and with such preferred arrangements a master clutch may be provided through which all local clutches may be driven. The local clutches may be individually controlled and may feed rotational power to a gear box suitably geared and controlled to vary the speed of rotation of the particular transfer belt pairs according to a predetermined plan. This latter described arrangement has been successfully employed with the position of the sheet blank controlling the rotational speed of the transfer belts, the position of the blank being detected by photosensitive device means. In this manner several sheet blanks may be in various progressively advanced stages of processing and since the individual belt pairs are individually controlled the various progressively positioned sheet blanks may be individually and independently processed and independently advanced according to their respective position along the workleg, as sensed by a photosensitive presence detection means. By providing belt pairs of sufficient length and by controlling the rotational characteristic of the belt pairs according to the position of the leading edge and the trailing edge of the sheet blank in process, as many as four sheet blanks may be in various stages of processing along the workline and when the finished sheet is ejected from the workleg a newly cut sheet blank is accepted from the sheet blank sizing and cuttting apparatus. By employing two worklegs and a dual direction evacuation sizing and cutting apparatus, finished sheets may be produced at the same rate as the sheet blanks are sized and cut, even though the hem forming and hem finishing process takes substantially longer, timewise, than the sizing and cutting of blanks.

FIGS. 3, 4, 5 and 6 represent that the floor of the transfer channel 50 is the upper portion of the endless transfer belt 84. FIG. 6 represents that the transfer belt 84 is reversible (see pulleys 85 and 86) so that the transfer channel floor transfer belt 84 may operate in coordination with the shoulder transfer belts 59 and 60.

FIG. 6 represents that the transfer channel of the workleg has a movable floor including a transfer belt 89. The floor of the transfer channel of the workleg would include a series of individual transfer belts which would individually cooperate with respective transfer belts on the shoulders of a workleg. Reference to FIG. 1 will show that the transfer means on the shoulders of a workleg includes a plurality of pairs of transfer belts. The pair of transfer belts 109 and 109' are driven at high speed to receive a cut blank from the sizing and cutting device and at sewing speed for transferring the blank to the next pair of transfer belts for passing the edges through the hem folding and sewing operations. Thus, a channel floor transfer belt, which corresponds in length to the length of the belt pair 109 and 109', is also driven at high speed and at sewing speed, synchronized with the belt pair 109 and 109'. It will be appreciated that each of the transfer belt pairs 93 and 93', 94 and 94', 95 and 95' and 96 and 96' each have associated therewith a transfer channel floor transfer belt which is driven in synchronism with a pair of transfer belts with which the floor transfer belt is associated.

If desired, the transfer channel floor transfer belt may be eliminated in favor of a channel floor having low friction characteristics with respect to the material of the cut blank.

Referring ot FIG. 6 it will be seen that the wall of the transfer channel 50 includes a door 97. The door 97 extends along the length of the transfer channel of the blank sizing and cutting apparatus or assembly. The door 97 may be manually operated or may be automatically operated, that is opened and closed for providing access into the transfer channel of the blank sizing and cutting apparatus. It is desirable to have convenient access into the transfer channel for example, to effect removal of an undesired cut blank, which may be a short blank or a blank of material which has a defect therein.

As previously mentioned the sheet blank is evacuated from the sizing and cutting device at the high speed receiving area, HSRAR on the right workleg and HSRAL on the left workleg. Assuming a sheet blank is evacuated from the sheet blank sizing and cutting device to the right hand workleg (as seen in FIG. 1) the sheet blank 25B is fully deposited on to high speed receiving area and a sheet blank leading edge position detector, positioned along the workleg, detects the position of the sheet blank through sensing the leading edge of the sheet blank. When the sheet blank has been fully received or deposited on the receiving area HSRAR, the transfer belt pair 93–93' is driven in synchronism with the belt pair 109–109' and the sheet blank is transferred out of the receiving area into the Hem Folding and Sewing Area HFSA at sewing speed.

The sheet blank is progressively passed from control of the transfer belt pair 109–109' to control of the transfer belt pair 93–93'. As the sheet blank is passed to and becomes under the control of the belt pair 93–93' the leading corners of the sheet blank are fed into self feeding folding devices, a device positioned of each shoulder.

Figure 9:
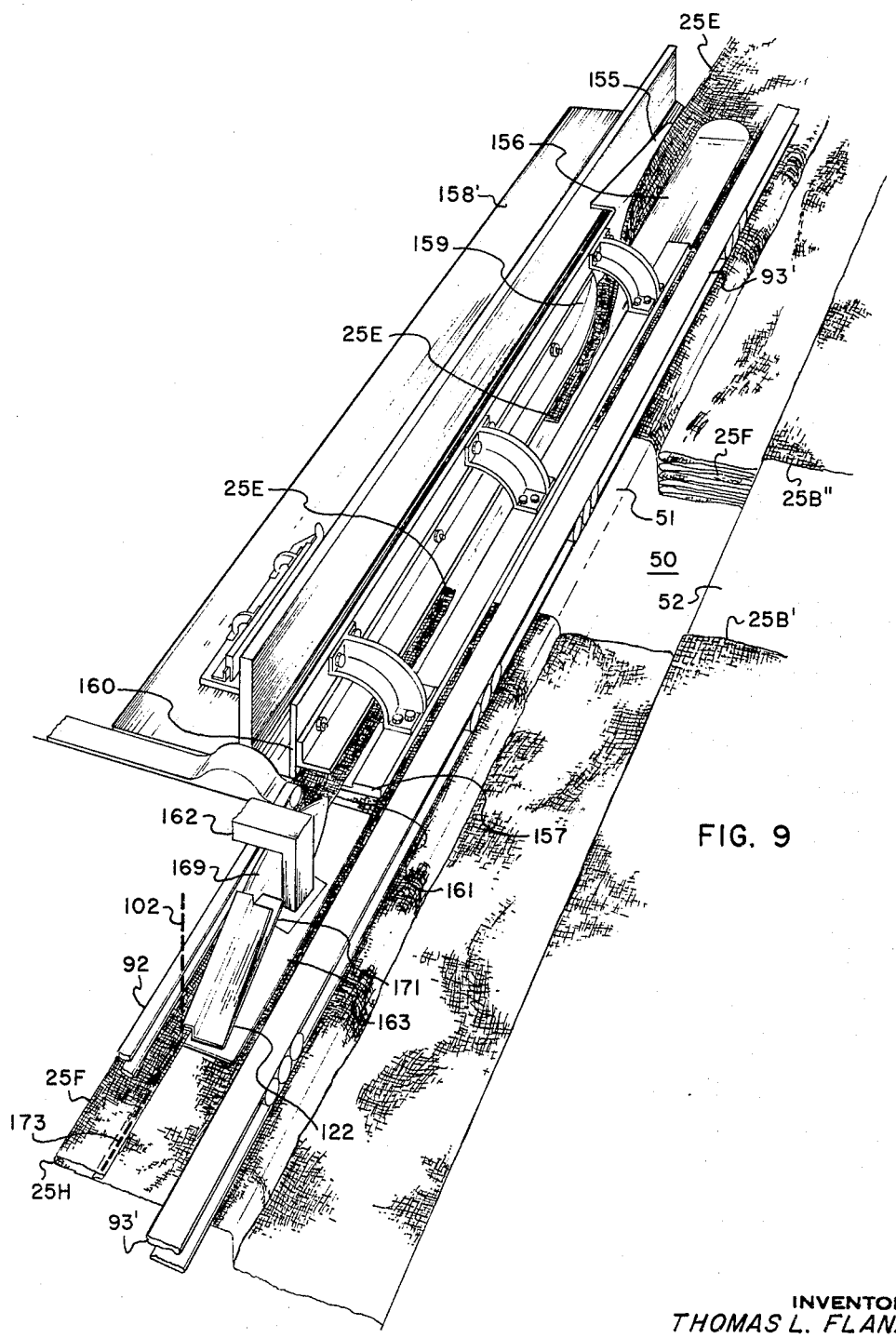
FIG. 9 is a perspective view of part of one shoulder and transfer channel of one workline showing the rotary indexable storage and retrieval device for a self-starting continuous flow folder and underfolder with cut blanks being conveyed along the workline and passing through the self-starting continuous flow folder and the underfolder.

Attention is directed to FIGS. 9 and 10. In FIG. 9 two sheet blanks 25B' and 25B" are shown to illustrate fully the confined, collected condition of the sheet blank body in the transfer channel 50, and the relation of the edge of the sheet blank 25E to the self-starting folding device. FIG. 10 shows, in plan view the relation of the edge of the the sheet blank 25E to the self-starting folding device and also shows the natural flow curve and folding action generated by the self-starting folding device. A natural flow folding device similar to the device shown in FIGS. 9 and 10 the sheet blank 25B is conveyed or transferred along the worklet with the edge 25E (one edge is shown) on the shoulder 51 and the other edge (not shown) on shoulder 52. A portion of the body of the sheet blank is collected and confined in the transfer channel 50 and is shown in a folded condition at 25F. The transfer belt 93' holds the edge 25E and adjacent portion of the sheet blank on the shoulder 51 and also conveys the sheet blank on the shoulder 52.

As the sheet blank is conveyed along the workleg by the transfer belts, the corners of the leading edge of the sheet blank approach the self-starting hem folder. The leading corners of the sheet proceed up a ramp 155 while the portion of the sheet blank adjacent to the edge passes under ply-separator plate 156/157. The hold-down portion of the plate has an up-lifted or ski-toe to ensure that the sheet blank passes under the hold down portion of the ply-separator plate. The combination of elevating the edge and holding down the body of the sheet creates a condition where the sheet blank folds itself. This is clearly seen in FIG. 9. The sheet blank is guided or urged, passively, into a condition whereby the natural stiffness of the material is overcome and the sheet material folds in a natural flow, folding along the natural flow guide bar 159. The edge 25E may be easily followed by observing FIG. 9. The newly created fold is held against the fold stop plate 160 with the edge 25E on the upper surface of the ply-separator plate 157. The self generated fold may be seen at 25F. A more detailed description of the natural flow folder is presented in my copending application Ser. No. 718,445, filed Apr. 3, 1968.

Figure 12:
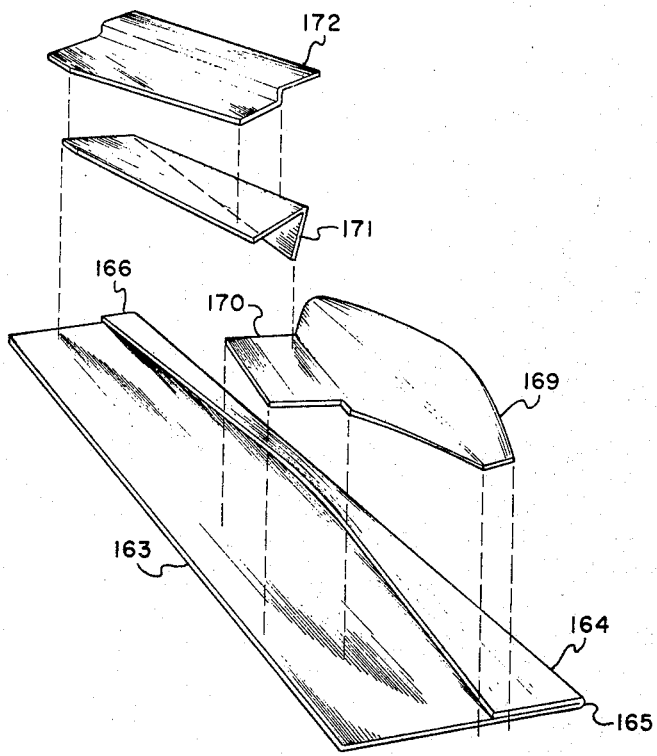
FIG. 12 is a view of the underfolder with the components exploded.

When the leading edge of the sheet blank exits from the natural flow folder at 161, the edge 25E is presented to an underfolder. The underfolder is illustrated in exploded view in FIG. 12 and seen in the FIGS. 9 and 10. The edge 25E at position 161 is fed from the natural flow folder device, which is essentially an over folder, to the underfolder. It will be noted that the edge 25E has been turned over 180° from the point at which the edge 25E proceeds up the ramp 155 to the position 161.

The underfolder is a passive folding device made of four (4) individually folded and/or contoured pieces which may be and essentially are combined externally, with respect to the folding channel. This feature distinguishes such passive underfolder device from other passive underfolders in that other passive folders used for providing small under folds are made from two or more individually folded and/or contoured pieces or components which are coupled or combined internally, with respect to the folding channel.

The underfolder is held in position by an overhead bracket 162. The bracket 162 may be coupled to the overhead structure such as 34, 35 and 36 shown in FIG. 1. Such structure over that part of the workleg where the folding devices are positioned has been eliminated for the sake of clarity.

The base plate 163 of the underfolder is a generally rectangular piece to which the bracket 162 is coupled. The base plate is held suspended above the surface of the body of the sheet blank but at a level so that the edge 25E passes out of the natural flow folder at position 161 and passes over the upper surface of the base plate 163. This is aided by the ply separation plate 157 of the natural flow folder on which the edge 25E lies after the overfold has been created. The base plate 163 has a folded edge 164 which is contoured to form a ramp which is sloped toward the ends of the base plate and has its apex at approximately the longitudinal center of the base plate. The forward part of the base plate at 165 is folded at 164 so that the top portion of the fold lies closely adjacent to (and may even contact) the bottom portion of the base plate while the rear portion of the base plate at 166 is folded so that the top portion is spaced from the bottom portion. This may be seen in FIG. 11, the end sectional view. The plate 169 includes a lip 170 by which the plate 169 is such as to cooperate with the ramp portion of plate 163 and form an inclined channel along which the edge 25E of the sheet blank travels. The edge 25E is essentially isolated from the rest of the sheet blank while passing along the inclined channel. An end inverting plate 171 and an end under-positioning plate 172 combine on the base plate 163 to invert the edge 25E into an under fold condition. It will be noted that the plate 171 has one end which is non-interfering as respects the edge 25E, this non-interfering edge may be coupled to the base plate 163 so that the edge interfering portion is positioned in line with the inclined channel. The plate 172 also includes a displaced edge portion which may be coupled to base 163 over the displaced edge portion of plate 171. This type of construction of the pre-formed plates provides an underfolder having an edge directing channel which is free as respects to coupling of the respective parts.

FIG. 11 shows the sheet blank 25 with the overfold at 25F and the edge 25E folded under to provide a hem with the inside edge finished in a triple layer of material.

In order to secure the triple folded hem a sewing machine is provided. FIG. 9 shows a broken line 102 which represents the needle of the sewing machine 102 shown in FIG. 1. FIG. 10 shows an X and a broken line 173 which represents the stitches sewn in the triple layer. The stitches 173 are also seen in FIG. 9.

Attention is now directed to FIGS. 7 and 8 where a sheet blank wrinkle detector is shown. Generally the wrinkle detector includes an elongated C shaped wrinkle feeler 190 which is very light in weight. In addition, the wrinkle feeler 190 may be a conductor material such as metal or be made of any other material with a strip conductor potentially connecting the terminals. The wrinkle feeler 190 may be suspended above the sheet blank 25 which passes along the shoulder, between the conveyor belt, such as 93' and the ply separator plate 156/157 of the folder. The wrinkle feeler may be positioned above the sheet blank between the belt 92 and the underfolder, if desired.

The loop ends of the wrinkle feeler 190 are rested in a set of mounted housing 191 and 192 with one loop end 193 pinned by a pin 194 which is free to ride in a slot 195 of the housing 192. One terminal 198 is spring loaded and held against the wrinkle feeler 190. The parallel coupled terminals 201 and 202 are spaced from the wrinkle feeler 190. Each of the mounted housing 191 and 192 are bracket mounted in adjustable fixtures 203 such as seen in FIG. 7.

Preferably, the wrinkle feeler bar 190 is suspended 1/8" above the sheet blank material 25 and just far enough below the terminal probes 201 and 202 to maintain an open circuit when the feeler bar 190 is fully resting on the housings 191 or 192 or both so that either terminal 201 or 202 is contacted. Upon contacting the terminal probe 201 or 202 an electric circuit is completed thus indicating the presence of a wrinkle. The wrinkle feeler bar 190 is positioned so that the bar lies parallel with the direction of travel 197 of the sheet blank.

Either end or both ends of the wrinkle feeder bar may be lifted by a wrinkle which exceeds 1/8" in height, according to the position of the wrinkle with respect to the ends of the feeler bar.

Referring now to FIG. 13 the control circuit for the traveling mender machine is represented partly in circuit and partly in block form. It will be appreciated that each of the traveling mender sewing machines 101 and 102 has its own control circuit. However, the master motor drive 103, master clutch 104, master clutch control 106 and master clutch brake 105 and the belt clutch 107, belt clutch control 108 and belt 109 (109') are common to both machines 101 and 102.

For the purpose of illustration and description, dual control of components common to each sewing machine have been omitted.

Sewing machine 101 is represented on rails 112 and 113, and the sewing machine has connected thereto a thread break detector (TBD) 114 and a top dead centering device (TDC) 115. The TBD may be a device which monitors thread presented to the needle of the sewing machine 101 and upon breakage of such thread opens a set of normally closed contact, represented by the closed contacts 116, in brokne line block. The thread break detector may be similar to that shown and described in copending application Ser. No. 619,380, filed Feb. 28, 1967 by Douglas G. Noiles et al. and assigned to the same assignee as the present application. The TDC apparatus may be a device which, when activated rotates the drive wheel of the sewing machine 101 until the needle of the sewing machine is in its upper most position, normally referred to as top dead center and holds the sewing machine in such condition until the TDC is deactivated. In the circuit shown heerin the actuating circuit for the TDC device includes a manually operated switch 117. The TDC apparatus may be similar to that shown and described in copending application Ser. No. 640,999, filed May 24, 1967 by George B. Saray and assigned to the same assignee as the present application.

Under normal operating conditions, relays MCR, 120, the Master Clutch Relay, SMR, 121, the Sewing Machine Relay BDR, 122, the Belt Drive Relay and TBDR, 123 the Thread Break Detector Relay are all energized. The energizing circuit for relay MCR includes a connection to a positive supply represented by a plus in a circle, a self holding contact 125 (which by-passes the normally open manual starting switch 126) and normally open contact 127, which is controlled by relay TBDR and closed when the relay TBDR is energized. A common ground is represented by a minus in a circle. The other side of contact 127 is coupled to ground. The relay TBDR is energized at all times except when a broken thread is detected and switch 116 is open. It should be understood that the positive supply includes a master switch which would control the supply of power to all positive terminals at the same time. Such master switch is not here illustrated. Relay MCR controls the form C contact 128/129. Part of this contact is slugged so as to slightly delay closure of contact 129 upon energization of relay MCR. Closure of contact 129 completes an actuating circuit for controlling clutch control 106 of the master clutch 104. Completion of this actuating circuit effectively releases master clutch 104 so that the mechanical drive from the motor 103 may be mechanically completed to the sew clutch control effectively opens the mechanical drive through the master clutch 105. When contact 128 is closed the clutch brake 104 is effectively holding or braking the master clutch 104 and with contact 128 open the brake 105 is released.

Relay SMR is controlled by the contact 131 which is a normally open contact of relay MCR. Thus when relay MCR is energized relay SMR is also energized. Relay SMR controls the sew clutch 130 through control of the fast acting contacts 132 and 133. When closed, contact 132 completes an actuating circuit which actuates the clutch brake 134 which effectively holds or brakes sew clutch 130. When contact 133 is open the clutch control 135 effectively uncouples the mechanical drive to the sew clutch 130 so that no power is transmitted to the sewing machine 101. Thus the sewing machine is inoperative. Upon closure of contact 133 the clutch control 135 is actuated and effectively mechanically couples the drive power to the sewing machine, thus to operate the sewing machine 101. Thus, it will be seen that as soon as a thread break is detected by the thread break detector the conditions of relays TBDR and MCR and SMR are reversed and the sewing machine 101 is stopped. It should be pointed out that MCR contact 129 is slugged so that there is a slight delay in pull-in or closure when relay MCR becomes energized. Further, it has been stated that contacts 132 and 133 of relay SMR are fast acting contacts. This assures that the mechanical drive for operating the sewing machine will be positively coupled or connected by the time the master clutch is released for transmitting power to the sew clutch from the main drive motor 103.

Relay MCR also controls relay BDR, 122 via the normally open contact 138. However, since there are occasions when it is desirable to hold relay BDR de-energized, the energizing circuit for relay BDR also incudes the self-holding contact 139 (which by-passes manual switch 140). Thus, when relay MCR is energized relay BDR can only become energized after closure of the manual switch 140. This permits the possibility of driving or operating the sewing machine without driving the belt drive system, represented by belt 109.

It will be further observed that energization of the relay BDR also depends upon energization of the relay TBDR, which depends upon continuity of thread presented to the needle of the sewing machine, 101.

Relay BDR 122 controls the normally open contact 141 which, when closed, completes an actuation circuit for the clutch control 108, which controls the belt clutch 107. If desired a brake may be included to further control the belt drive. It has been found that deceleration of the belt 109 after cut-off of the drive power is very rapid and deceleration is normally constant for the same speed. Thus, when a thread break occurs operation of the entire system is interrupted by reversing the condition of all relays. This includes stopping the sewing machine and stopping the belt drive. It is apparent that neither the sewing machine nor the belt stop instantly upon cut off (when a thread break is detected). Thus the belt has some over-travel as it slows to a stop. The portion of the blank which is unsewn (because of the lack of thread) has thus passed beyond the normal sew point of the sewing machine (point X in FIG. 10). Experimentation has shown that the leading edge of the unsewn portion of the blank being sewn (the trailing edge of the sewn hem) has an over travel of six to eight inches beyond the needle point or sewing position. In order to mend the unsewn portion another or auxiliary sewing machine may be provided which would be located "down-stream" from the normally operated sewing machine in the sew line. An alternative would be to reverse the direction of travel of the blank and essentially "back-up" the blank so that the unsewn portion may be mended. Another approach, which the preferred method, and the method disclosed herein is to move or relocate the sewing machine in the "downstream" direction effectively moving the sewing position downstream. This relocating is known as "indexing."

After the sewing machine is indexed or advanced to a point farther downstream than the trailing end of the sewn portion of the sheet blank hem, the sewing machine then sews its way back to its original sewing position thereby fully mending the unstitched portion of the hem. When the traveling mender sewing machine sews back to its normal (original) position the full operation of the apparatus is resumed.

In order to relocate or "index" the sewing machine 101 a two-way auxiliary drive 144 is provided. The auxiliary drive 144 is actuated to index the sewing machine 101 (thus driving the sewing machine physically downstream) when the relay MCR is de-energized (thereby releasing normally closed contact 143) and the TDC switch 145 is closed and the trip switch 146 is closed. The TDC switch 145 becomes closed when the sewing machine is in top dead center. In order to "top-dead-center" the sewing machine 101, contact 147, a normally closed contact controlled by the SMR relay, must be closed and switch 117 is manually closed to actuate the top dead centering unit 115. As previously described de-energization of relay SMR results from detection of a break in thread presented to the needle of the sewing machine.

With respect to the trip switch 146, when the sewing machine is in its normal position, trip switch 146 is closed and trip switch 148 is open. When the sewing machine 101 is being driven to its index position by the auxiliary drive 144, the switch 146 remains closed and switch 148 remains open. When the sewing machine 101 arrives at the index position switch 146 becomes open and switch 148 closes. The switches remain in this condition while the sewing machine sews its way back to its normal position and, when the sewing machine is returned to its normal position the switch 146 becomes closed and switch 148 becomes open.

When the sewing machine 101 is top-dead-centered the needle may be re-threaded. The re-threading, the switch 116 will be closed. This will complete the energizing circuit for relay TDBR which prepares relay MCR for energization upon the manual closing of switch 126. With the sewing machine 101 indexed and re-threaded the auxiliary drive 144 may then be actuated to drive or physically return the sewing machine 101 to its original position. This phase is started by energizing relay MCR, which energizes relay SMR but relay BDR remains de-energized. Relay MCR, closes its normally open contact 149 and relay SMR closes its normally open contact 150. Normally closed contact 151 of relay BDR remain closed (relay BDR is de-energized) and the trip switch 148 is also closed thereby completing the actuating circuit for the auxiliary drive for driving the sewing machine 101 back to its normal or original position. Since relay SMR is energized the sewing machine 101 sews its way back to its home position. In its home position trip switch 148 opens and switch 146 closed but both contacts 143 and switch 145 are open thus preventing indexing of the sewing machine.

To resume normal operation manual switch 140 may be closed so that relay BDR may become energized and start the belt 109 driving the blank along the line. During repair and/or mending, the sewing machine on the opposite workline or sew line, for example sewing machine 102 is disabled by a simple interlock circuit and begins operation in coincidence with resumption of normal operation of sewing machine 101. Parts of the above operation are described as being manual since in successfully practicing the present invention the machine included several manual steps.

However, a full automatic system for a traveling mender may be made by including a top-dead-centering device which responds to detection of a broken thread, an automatic needle threading device which responds to the top-dead-center device holding the sewing machine in a top-dead-center position, and other manual switches, such as 126 and 140 may be made to respond to predetermined conditions thereby providing a fully automatic traveling mender having operations initiated in response to detection of a broken thread presented to the needle of the sewing machine.

Thus I have described the preferred embodiment of my invention. Changes, alterations and substitutions may be made, as will be familiar to those skilled in the art, without departing from the spirit of the invention as defined in the appended claims.

What is claimed is:

1. Apparatus for successively making blanks of predetermined size from a supply of material and preparing said blanks for transfer including;

a supply of material from which successive portions may be drawn, means for separating successively drawn portions of predetermined size from said supply for forming blanks of predetermined size including, means for clamping the edge of said material between the longitudinal edges, means coupled to said clamping means for flat drawing a predetermined portion of said material from said supply for drawing said portion to length, means for severing said predetermined portion from said supply for forming a blank of predetermined size, a transfer channel lying transverse to the said longitudinal edges and within the extremes of said flat drawing means, said channel having opposite shoulders and adjacent walls spaced for forming said channel, means for depositing a portion of the body of said blank in a collected condition in said transfer channel, means for securing the cut edges of said blank to each of said shoulders, respectively, and means for conveying said secured cut edges along said shoulders for evacuating said blank from said blank forming apparatus.

2. Apparatus for successively making blanks of predetermined size as in claim 1 and in which said means for depositing a portion of the body of said blank in a collected condition in said transfer channel includes;

first and second rollers adapted to grasp a portion of said blank between said longitudinal edges, means for rotating at least one of said first and second rollers for driving the portion of the blank so grasped into said transfer channel, and means coupled to said clamping means for moving said clamping means toward said rollers for permitting said grasped portion of said body to be driven into said transfer channel.

3. Apparatus for successively making blanks of predetermined size as in claim 1 and in which said means for depositing a portion of the body of said blank in a collected condition in said transfer channel includes;

at least a roller adapted to contact a portion of said blank between said longitudinal edges, means for rotating said roller at a first rate for driving the portion of the blank so grasped into said transfer channel, a slip-clutch disposed between said rotating means and said roller and toward said roller for permitting said portion of said body to be driven into said transfer channel at a second rate.

4. Apparatus for successively making blank of predetermined size as in claim 1 and in which said transfer channel further includes;
  a floor separating said spaced walls and said floor includes;
    a moveable surface cooperating with said means for conveying for carrying the collected body of said blank along with the secured edges during evacuation of said blank from said blank forming apparatus.

5. Apparatus for successively making blanks of predetermined size from a supply of material for making flat bed sheets therefrom and for preparing the flat bed sheet blanks for transfer to a workline including;
  a supply of material from which successive portions may be drawn,
  means for separating successively drawn portions of predetermined size from said supply for forming flat bed sheet blanks of predetermined size, said blank having a width equal to the intended width of the finished flat bed sheet and having a length longer than the intended length of the finished flat sheet, said separating means including;
    means for clamping the edge of said supply of material, across the width thereof,
    means coupled to said clamping means for flat drawing a predetermined portion of said material from said supply for defining the length of said blank,
    means for severing said predetermined portion from said supply for forming said flat bed sheet blanks of predetermined size,
  a transfer channel lying transverse to the direction of flat draw and within the extremes of the flat drawing means said channel having a floor separating opposite walls and each wall having an adjacent shoulder extending away from said channel,
  means for depositing a portion of the body of the severed blank in a collected condition into said channel,
  means for securing the cut edges of said blank to each of said shoulders, respectively, and
  means for conveying said secured cut edges along said shoulders for transferring said flat bed sheet blank from said blank forming apparatus.

6. Apparatus for successively making blanks of predetermined size from a supply of material for making flat bed sheets therefrom as in claim 5 and in which said means for depositing includes;
  at least a roller adapted to contact a portion of said flat bed sheet blank across the width thereof,
  means for rotating said roller for driving successive portions of the body of said blank into said transfer channel in an accordian type fold arrangement,
  a slip clutch disposed between said rotating means and said roller, and
  means for advancing the edge of said blank so clamped by said clamping means toward said roller at a controlled rate.

7. A system for successively making blanks of predetermined size from a supply of material and preparing said blanks for transfer including;
  means for storing a supply of material from which successive portions may be drawn,
  means for clamping the edge of said material across the width thereof,
  means for flat drawing a portion of said material from said supply and for drawing said portion to a predetermined length,
  means for severing said flat drawn portion from said supply for forming a blank of predetermined size,
  means defining a transfer channel for confining a portion of the body of said blank,
  means for depositing a portion of the body of said blank into said means defining a transfer channel, in a collected, confined condition,
  means for securing the edges of said blank above the level of said transfer channel, and
  means for conveying said secured edges for transferring said blank.

8. A system for successively making hemmed flat articles from a supply of material having finished edges along the longitudinal edges comprising;
  means for storing a supply of said material from which successive portions may be drawn,
  means for separating successive portions of predetermined size from said supply for forming blanks of said material,
  means defining a transfer channel for receiving a portion of the body of said blank,
  means for driving a portion of said body into said transfer channel for collecting said portion of said body in said channel,
  means extending said transfer channel for forming a workline for processing said blank into a hemmed flat article including;
    means for securing the edges of said blank on each shoulder of said transfer channel respectively,
    means for conveying said blank along said transfer channel with the edges of said blank seccured on the said shoulders,
    means for hem folding each edge during conveyence of said blank,
    means for hem sewing each said hem so folded,
    means for closing the leading edge of each said hem so folded, and
    means for closing the trailing edge of each said hem so folded.

9. A system for successively making hemmed flat articles as in claim 8 and further including;
  means forming the floor of said transfer channel for conveying the collected body portion of said blank along said transfer channel in cooperation with the first mentioned means for conveying.

10. A system for successively making hemmed flat articles as in claim 8 and further including;
  means disposed on each said shoulder in the area of each said hem folding means respectively for detecting wrinkles developed in said edges of said blank during folding of the hem and before the sewing thereof.

11. A system for successively making hemmed flat articles as in claim 8 and in which said means for hem sewing is a sewing machine and said sewing machine includes;
  means for detecting continuity of thread presented to the needle thereof,
  means responsive to discontinuity of said thread for interrupting operation of the system,
  means for advancing the sewing machine in the direction of travel of said blank, and
  means for returning said sewing machine to its original position and sewing said hem during the return travel.

12. A system for successively making hemmed flat articles from a supply of material having selvages along the longitudinal edges thereof;
  a supply of said material from which successive portions may be drawn,
  means for separating successive portions of said material of predetermined size from said supply for forming blanks of said material, including
    a draw clamp for clamping the edge of said material between the selvages,
    means for moving the draw clamp so clamping the said edge for flat drawing a portion of said material from said supply, means for severing said portion so drawn for forming a blank of material of predetermined size, a transfer channel having opposite shoulders, adjacent spaced walls and a floor so spacing said walls, roller means adapted to make contact with the body portion of said blank for driving a portion of the body of said blank into said transfer channel, means for moving said draw clamp toward said roller means for permitting consecutive increments of said body portion to be driven into said transfer channel, means for securing the cut edges of said blank to said shoulders for holding said cut edges on said shoulders, a workline including opposite shoulders, adjacent spaced walls and a floor so spacing said walls, said opposite shoulders of said workline aligned with the opposite shoulders of said transfer channel and the adjacent spaced walls on floor of said workline aligning with the adjacent spaces walls and floor of said transfer channel, means for transferring said blank along said transfer channel on said opposite shoulders of said transfer channel for transferring said blank from said transfer channel onto said workline, means for conveying said blank along said workline with the cut edges of said blank on the shoulders of said workline, hem folding means for hem folding the cut edges of said blank during conveyance, wrinkle detection means for detecting wrinkling of the blank adjacent to the cut edges during conveyance through said folding means, and sewing means for sewing the hem folded edges.

13. A system for successively making hemmed flat articles as in claim 12 and in which said sewing means includes;

a first pair of sewing machines for simultaneously sewing each respective hem folded edge on the respective shoulders of said workline, and a second pair of sewing machines for simultaneous sewing the sewn folded edges closed.

14. A system for successively making hemmed flat articles as in claim 12 and in which said wrinkle detector includes;

first and second spaced mounting disposed above the shoulder of said workline, an elongated shoe suspended from said first and second clamps over said blank on said shoulder, one end of said shoe pivotally coupled to said first mounting and slidably coupled to said second mounting, a first terminal connected to said shoe at one end thereof, a second terminal spaced from said one end, and a third terminal spaced from the other end of said shoe, said shoe being disposed above said blank on said shoulder and displaced so as to connect with said second and said third terminal by appearance of wrinkle in the material of said blank passing under said shoe.

15. A system for successively making hemmed flat articles as in claim 12 and in which said roller means includes;

at least a driven roller adapted to be raised over and lowered onto the body of said blank, means for rotating said roller for driving a portion of the body of said blank into said transfer channel, a slip clutch disposed between said roller and said rotating means for synchronizing rotation of said roller with the incremental advance of said blank.

References Cited

UNITED STATES PATENTS

| | | |
|---|---|---|
| 2,546,831 | 3/1951 | Newell. |
| 2,738,746 | 3/1956 | MacIsaac et al. |
| 3,224,394 | 12/1965 | Dobner et al. |
| 3,375,796 | 4/1968 | Greenberg et al. |

JAMES R. BOLER, Primary Examiner

U.S. Cl. X.R.

112—203